March 22, 1955 C. W. MUSSER 2,704,532

COLLET GUIDING IN MECHANICAL PENCIL

Original Filed Oct. 10, 1950 3 Sheets-Sheet 1

INVENTOR
C. Walton Musser

BY

ATTORNEYS

COLLET GUIDING IN MECHANICAL PENCIL

Original Filed Oct. 10, 1950 3 Sheets-Sheet 2

INVENTOR
C. Walton Musser
BY
ATTORNEYS

March 22, 1955 C. W. MUSSER 2,704,532

COLLET GUIDING IN MECHANICAL PENCIL

Original Filed Oct. 10, 1950 3 Sheets-Sheet 3

INVENTOR
C. Walton Musser.
BY
ATTORNEYS

United States Patent Office 2,704,532

Patented Mar. 22, 1955

2,704,532

COLLET GUIDING IN MECHANICAL PENCIL

C Walton Musser, Philadelphia, Pa., assignor to Prismatic, Inc., Southampton, Pa., a corporation of Pennsylvania Original application October 10, 1950, Serial No. 189,309. Divided and this application July 16, 1951, Serial No. 236,975

1 Claim. (Cl. 120—14.5)

The present invention relates to mechanical pencils particularly of the character which select an individual color from a plurality of available colors of leads.

This application is a division of application Serial No. 189,309, filed October 10, 1950, for Mechanical Pencil. Subject matter also divided from the same parent application appears in copending applications Serial No. 236,976, filed July 16, 1951, for Lead Reservoir for Mechanical Pencil and Serial No. 236,977, filed July 16, 1951, for Mechanical Pencil Employing Clip in Assembly.

A purpose of the invention is to provide a tip having at the forward end a central lead opening, having a shoulder located interiorly of the central lead opening and having a tubular collet canal to guide and longitudinally compress collets in the collet canal and against the shoulder.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 5:
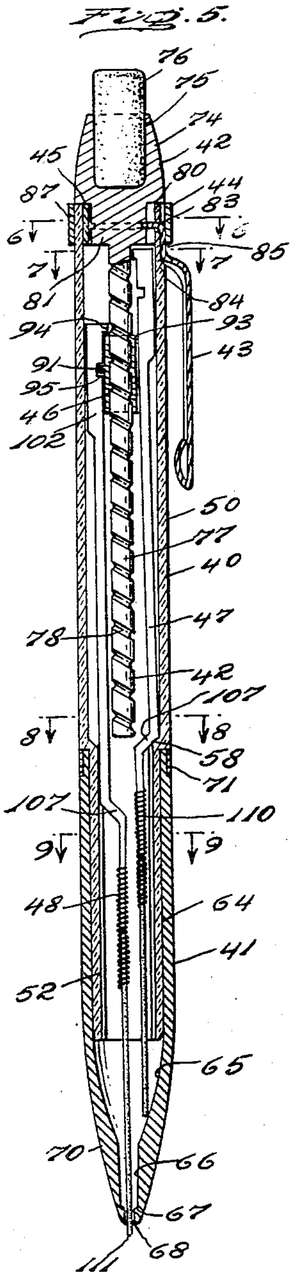
Figure 5 is an axial section of the pencil of Figure 1.
Figure 5B:
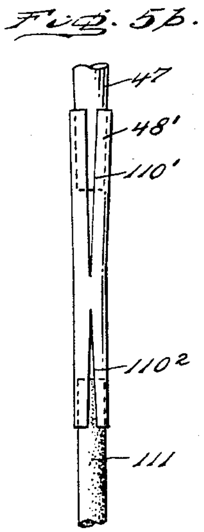
Figure 5A:
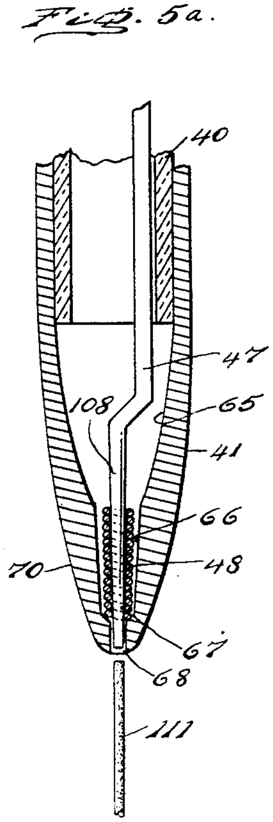

Figure 5*a* is an enlarged fragment of Figure 5, with the collet compressed longitudinally in a lead-changing position.

Figure 5*b* is an elevation of an alternate collet engaged on a segment and holding a lead.

Figures 6 to 9 inclusive are respectively sections on the lines 6—6, 7—7, 8—8 and 9—9 of Figure 5, to enlarged scale.

Figure 8:
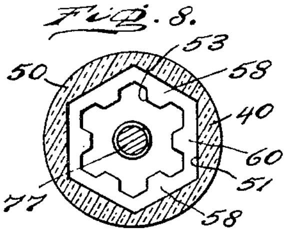
Figure 8A:
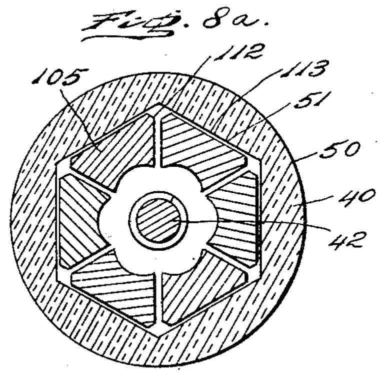

Figure 8*a* is an enlarged section corresponding to Figure 8, showing the segments in retracted position. The segments have been omitted in Figure 8 for clarity in illustration.

Figure 8B:
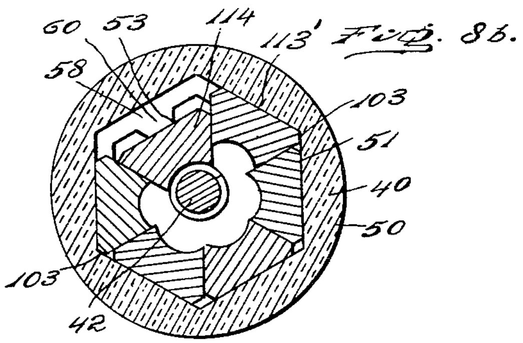

Figure 8*b* is a view corresponding to Figure 8*a* but showing one segment advanced and the other segments lock out.

Figure 9:
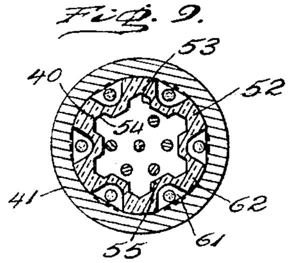
Figure 9A:
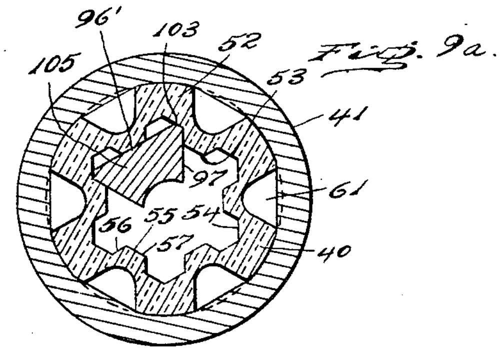

Figure 9*a* is an enlarged section corresponding to Figure 9, omitting the leads in the reservoir and showing the selected segment further forwardly advanced, while omitting the other leads shown in Figure 9.

Figures 1, 2, 3, 4:
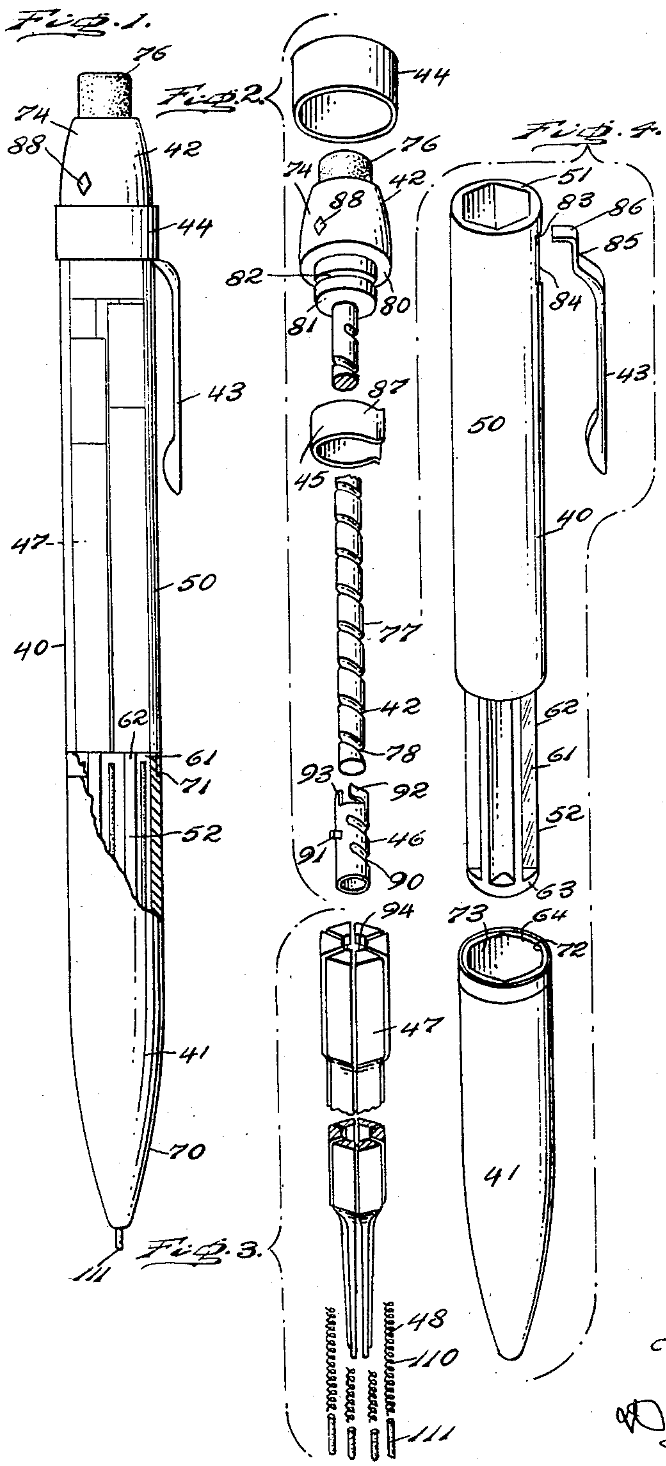
Figure 1 is a side elevation of the preferred embodiment of the invention partially broken away to show the reservoir for spare leads inside the tip.
Figure 2 is an exploded perspective, partially broken away, of the helix and nut assembly of Figure 1.
Figure 3 is an exploded perspective partially broken away, of the segments, collets and leads of Figure 1.
Figure 4 is an exploded perspective of the barrel, clip and tip of Figure 1.
Figure 10:
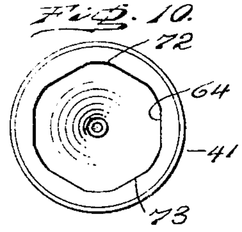

Figure 10 is an enlarged rear end elevation of the tip of Figure 1.

Figures 11, 12, 13, 14, 15, 16, 17, 18:
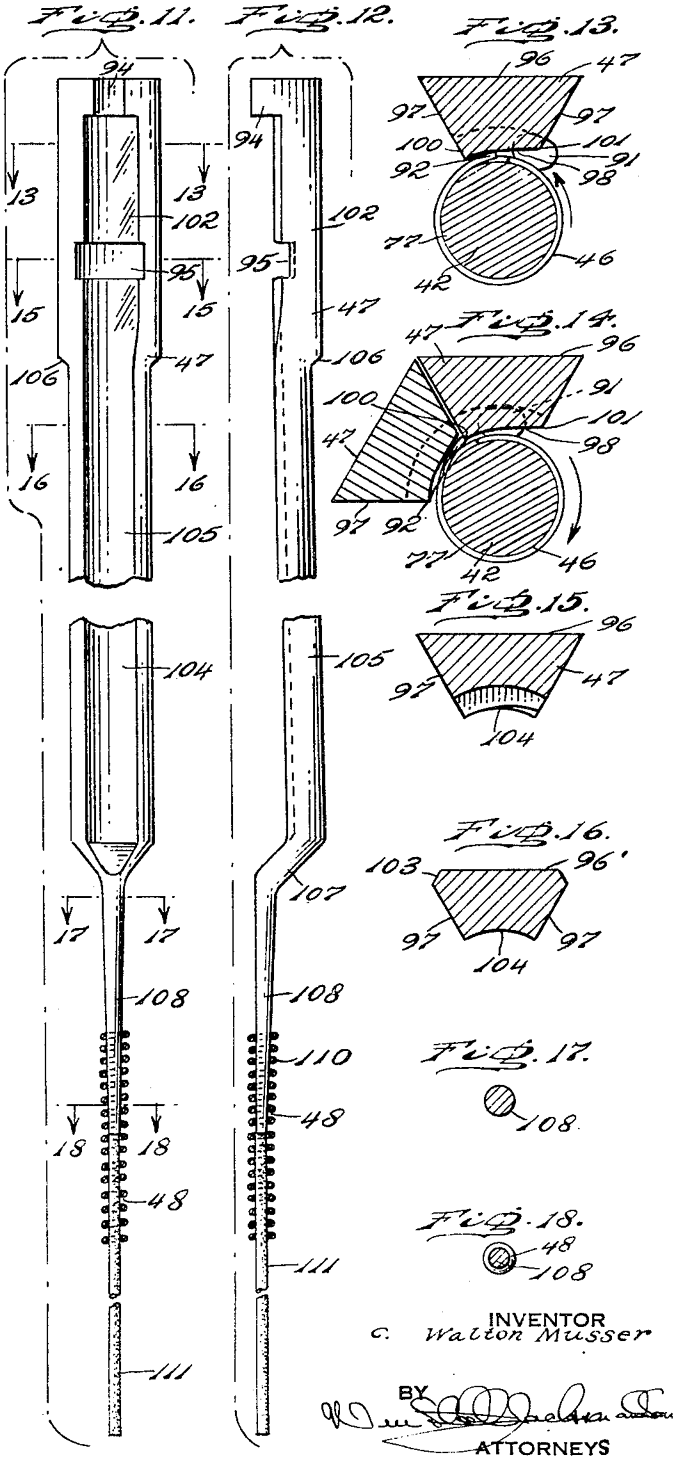

Figure 11 is an enlarged interior elevation, partially broken, of a segment, collet and lead of Figure 1.

Figure 12 is a side elevation of Figure 11.

Figure 13 is an enlarged section of Figure 11 on the line 13—13, showing also the helix and the nut in position for the pawl to pass over the ratchet face of a segment.

Figure 14 is a view similar to Figure 13, but showing an additional adjoining segment, with the pawl and driving projections in selecting position with respect to the first segment.

Figures 15 to 18 inclusive are enlarged sections of

Figure 11 on the lines 15—15, 16—16, 17—17, 18—18 respectively.

In the drawings like numerals refer to like parts throughout.

The present invention is directed to pencils in which a plurality of colors are available, and especially to those in which a multiplicity of color selections can conveniently be made. In the prior art, where a variety of colors have been available for selection in a mechanical pencil, the mechanism has been complicated and expensive and the operation has often been inconvenient or unreliable.

In accordance with the present invention, a mechanical pencil having a barrel and lead supports in the barrel is provided with a tip secured at the forward end of the barrel and having a central lead opening, having a shoulder located interiorly of the central lead opening and having a tubular collet canal adapted to receive and guide collets on the interior of the tip rearwardly of the shoulder. Longitudinally compressible collets are mounted on the lead supports and having a diameter which will engage the shoulder and extend through the collet canal. The collets are guided by the collet canal to prevent lateral deflection, and are longitudinally compressed against the shoulder.

In the preferred embodiment of the present device, the same element accomplishes color selection and propulsion and retraction of the selected lead. By motion of the color selecting element in one direction of rotation, ratcheting is accomplished over the various segments for individual colors, and by motion of the color selecting element in the opposite direction, the ratcheting parts prevent relative turning between the segment of the selected color and the ratchet and cause that segment to be propelled or repelled.

As an individual segment advances, the segments of the unused colors are locked out by wedge action. The locked out segments prevent the driving projection on the nut from leaving the driving recess of the forward segment until it is retracted. The advancing segment is moved radially toward the center on the start of forward motion to align the lead with the hole in the tip, and to exert the lockout action. A duohexagonal construction on the interior of the barrel guides the advancing segment against rotation, and also prevents longitudinal motion of the locked out segments.

The position of the propelling or repelling segment is visible through the transparent barrel by observing an indication on the segment, and this indication serves also to show the amount of lead available in the collet of that segment. The indication desirably provides a limitation on the forward advance of that segment.

The assembly of the components is very conveniently accomplished by using the clip as a fastener to secure the helix to the barrel.

Considering first the form of Figures 1 to 18 inclusive, the pencil of the invention includes a barrel 40, a tip 41, a helix 42, a clip 43, a barrel band 44, a friction spacer 45, a nut or shoe 46, segments 47 and collets 48.

The barrel is very desirably made from a clear or transparent plastic, such as polystyrene or methyl methacrylate, and includes a generally tubular barrel portion 50, suitably of cylindrical exterior contour as shown, having a polygonal interior cross section 51 as best seen in Figures 6, 7, 8, 8*a* and 8*b*. The actual form shown is hexagonal to correspond with the six available colors, but it will be understood that any suitable polygonal form such as triangular, rectangular, pentagonal, hexagonal, heptagonal, octagonal, nonagonal or the like may be employed for the cross section.

Figure 6:
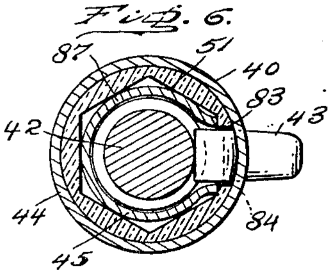
Figure 7:
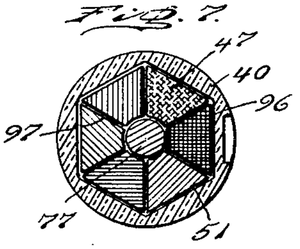

The barrel interior maintains the same generally polygonal cross section from the rear end as shown in Figures 6 and 7 to a position approaching the middle as shown in Figures 8, 8*a* and 8*b* except that there is suitably a slight tapering convergence toward the forward end which aids in withdrawing cores, forces or plugs from the mold and which guides the propelled segment slightly toward the center as later explained. The amount of this taper may be comparatively slight. In an actual embodiment, for example, a convergence of 0.015 inch between the opposite barrel polygonal sides has been found to be adequate.

Forward of the generally uniform polygonal cross section as just described, a forward extension 52 is provided of reduced external and internal diameter as shown in Figures 4, 5, 9 and 9*a*. The reduced portion 52 of the barrel has an internal cross section 53 which is well shown in Figures 8, 8*b*, 9 and 9*a* and may be aptly described as duopolygonal or in the actual case duohexagonal, constituting as it does a hexagonal cross section within another hexagonal section for the purpose of guiding and propelling or repelling segment as later explained. The duohexagonal structure comprises basically polygonal sides 54 which are considerably closer together than the sides of the cross section 51, and, at the middle of each side, lands 55 which extend toward the interior of the cross section and extend longitudinally. In the preferred embodiment, where six sides are used (Figure 9*a*), the adjoining side 56 of each land 55 is desirably parallel with the adjoining side of the next land and also with adjoining sides of the opposite pair of lands, the sides 56 of the lands therefore being capable of functioning with the inner surfaces 57 of the lands as retaining and guiding surfaces for the propelling and repelling segment. The space between each pair of lands represents four sides of an incomplete hexagon having equal sides and angles of 120°, within reasonable tolerance (as seen in Figure 9*a*).

The interior cross section 53 desirably converges toward the forward end, so that the cross section tapers slightly, the amount of convergence of opposing sides 54 of the polygon being of the order of 0.016 inch in a particular example. The convergence aids in withdrawing mold parts and also aids in guiding the propelled segment toward the center as later explained.

The sides 54 of the basic polygon in the cross section through the barrel portion 52 are longitudinally in line with the sides of the polygon in the portion 50 of the barrel so that a segment sliding along the side of the polygon in the portion 50 will correspondingly encounter the side of a similar polygon in the portion 52.

An abrupt inward cam surface is provided at 58 between the sides of the polygon of portion 50 and of portion 52, desirably disposed at some steep angle to the axis preferably of the order of 45°. As best seen in Figures 8 and 8*b*, this cam face is itself polygonal in end elevation and includes inwardly extending cam portions 60 on the ends of the lands 55.

The outside of the barrel portion 52 of reduced cross section has at positions corresponding to the sides of the basic internal polygonal cross section, grooves 61 extending longitudinally almost but not quite to the ends of the reduced barrel portion 52. Ribs 62 separate the grooves 61 and an annular portion 63 closes the forward ends. The rearward ends of the grooves 61 are closed by the cams 58.

The forward end of the barrel is provided with the tip 41 which is fastened to the barrel in any suitable manner preferably by a snap action as later explained. The tip has an inner bore 64 which surrounds the reduced portion 52 of the barrel, which then gradually tapers or converges at 65 toward a collet well 66 near the forward end which again tapers or converges at 67 into a center lead guiding opening 68 best seen in Figures 5 and 5*a*. The exterior portion of the tip gradually converges at 70 toward the forward end.

The rear end of the tip is preferably provided with a metallic tip band 71 which protects the tip against any tendency to stretch or split. The tip may be made of any suitable material, but it is generally preferable to employ a plastic such as polystyrene, cellulose acetate, cellulose acetate butyrate, phenol-formaldehyde, urea-formaldehyde or the like rather than metal.

To render the tip readily removable and at the same time permit it to be inserted easily into position, the interior bore 64 of the rearward portion of the tip is provided with grooves 72 as best seen in Figures 4 and 10 which correspond in placement to the positions of the ribs 62 and are sufficiently deep to allow the tip to slide longitudinally over the ribs without undue friction when the grooves 72 are aligned circumferentially with the ribs 62. Between the grooves 72 are flats or lands 73 which are comparatively shallow, suitably being of the order of a few thousandths of an inch, so that after the tip is inserted in place on the barrel with the grooves 72 corresponding in position with the ribs 62, a slight twisting of the tip with respect to the barrel will lock the tip on the barrel by jamming the outer circumferential edge of the ribs 62 against the lands 73 on the inside of the tip.

The opening 68 in the forward end of the tip in many cases can be without metallic reinforcement, and therefore such reinforcement is not regarded as essential and has not been shown.

While the tip is shown applied by means of the grooves and lands, it will be understood that the tip may be secured in any other suitable manner as desired.

The helix 42 comprises an adjustment head 74 having a socket 75 which receives and frictionally holds an eraser 76 and a central inwardly extending screw portion 77 extending through the interior to the forward end of the barrel portion 50 and provided with a helical thread 78 which may extend in either direction but which, to agree with the direction of ratchet used, is left hand as shown.

The helix may be of any suitable material, but it is preferable to employ a plastic such as polystyrene, cellulose acetate, cellulose acetate-butyrate, phenol-formaldehyde or urea-formaldehyde rather than metal.

The forward end of the adjustment head 74 is shouldered at 80 as best seen in Figure 2 and between the shoulder and the screw portion 77 is located a hub 81 of reduced cross section compared to the head and which is suitably positioned immediately inside the rear end of the barrel. The hub has an annular outside groove 82 intermediate between the ends of the hub.

The barrel portion 50 at one position in the circumference as best seen in Figures 4 and 6 has an inwardly extending slot 83 and is suitably provided with a recess 84 forward of the slot. The clip 43, suitably of resilient metal such as brass or bronze, has a base portion 85 which fits in the recess 84 and has a transverse tang 86 which extends through the slot 83 and at its inner end engages in the annular groove 82 on the hub 81 of the helix. A suitable U-shaped resilient friction spacer 87 as best seen in Figures 2 and 6 is placed around the hub between the hub and the barrel with the open portion of the U spanning the tang 36. The spacer 87 frictionally engages the parts by an amount which is readily predetermined, retards the helix against excessively free rotation in the barrel and prevents plastic from running on plastic.

The press-fitting barrel band 44 surrounds the base portion 85 of the clip and holds the tang in position in the groove 82, and the tang prevents the helix from moving longitudinally as it turns with respect to the barrel.

A suitable indication 88, shown as a diamond, on the head 74, aids in orienting the helix for color selection as later explained.

The shoe or nut 46, as best seen in Figure 2, threads on the thread on the helix. The shoe has internal thread projections 90 which are in the embodiment shown of left hand thread character to correspond with the threads on the helix. As shown, the shoe is best formed from sheet metal or tubing of brass, bronze, beryllium copper or steel.

A driving projection or dog 91 extends outwardly from the shoe at one position of the circumference preferably intermediate the ends. At the rearward end of the shoe a resilient finger or pawl 92 extends outwardly circumferentially from the shoe as best seen in Figures 2, 13 and 14. The pawl is positioned for engagement in the clockwise direction of the motion of the helix as viewed from the rear toward the front of the helix. When the pawl selects, the selected segment corresponds in circumferential position with the diamond or other indication 88 so that the diamond will show what segment has been selected. The remainder of the rear end of the shoe or nut provides an annular surface 93 except where it is broken by the outward projection of the pawl.

Positioned radially around the screw portion of the helix and around the nut are the segments or carriers 47, corresponding in number to the number of sides on the polygonal cross section 51 (in the present embodiment there are six shown). Each of the segments has (as best seen in Figures 5, 11 and 12), a rear inward aligning projection 94 which engages behind the rearward circumferential edge 93 of the shoe when the shoe is in its rearward position. The segments also have a driving recess or groove 95 which receives the driving projection or dog 91. The cross section of the segment between the driving recess 93 and the aligning projection 94 is generally a fraction of the polygonal cross section (one-sixth in the present case), with slight clearance for movement between segments, thus having as shown in Figures 7, 13 and 14 an outer edge 96 corresponding to one side of the polygonal cross section 51, and radial inwardly extending sides 97. The interior face 98 is a ratchet having a projection or high portion 100 in position to be engaged by the pawl when the motion is clockwise looking from the rear forwardly as in Figure 14, and having a low side 101 which permits the pawl to be cammed over the ratchet face 98 when the motion is counterclockwise when viewed from the rear toward the front as in Figure 13.

In effect the rearward portion of the segment which provides the ratchet, the driving recess and the aligning projection is in the form of a head 102 which is sufficiently thick in radial dimension to occupy practically the entire space between the screw portion of the helix and the inside of the barrel.

Forward of the driving recess 95 the segment is reduced in segmental width by diagonal corner cut-offs 103 (120° angles included) as best seen in Figure 16, the sides 97 still being generally radial but not extending fully to the outer corners, and the outer polygonal side 96' being narrowed by the corner cut-off. The inner surface 104 is conveniently the arc of a circle which extends to the forward end of the driving recess 95.

In the form shown in Figure 16 the angle between the two sides 97 of the segment is desirably 60°.

The cross section of Figure 16 of the segment has a slight clearance or is slightly less than one-sixth of the hexagon so that the individual segment which is being propelled or repelled can move readily inwardly as later explained.

The guiding portion 105 of the segment which has just been described is joined to the head 102 by a suitably diagonal (preferably 45° to the axis) cam surface indication 106 as best seen in Figures 11 and 12, which performs the dual function of showing the position of advance of the segment through the transparent barrel and serving as a stop for the advance of the segment as later explained.

The segment toward its forward end is inwardly offset at 107, preferably at an angle of about 45° to the axis, producing an outer cam surface which cooperates with the cam surface 58 on the barrel. Forward of the offset 107 a forwardly tapering circular cross section 108 is provided which reduces at the forward end to approximately the diameter of the lead. The forward end 108 extends diagonally toward the center and assists in directing the lead to the center of the tip.

The manner by which the lead is held on the forward end of the segment, or specifically the collet which is used, forms no part of the present invention, the particular collet construction illustrated in the preferred embodiment being the subject matter of Jacobson and Jacobson co-pending application Serial No. 203,522, filed December 29, 1950, for Mechanical Pencil and Collet Therefor. In this particular form the collet comprises a spiral spring 110 which surrounds the forward tapering end 108 of the segment and also surrounds and grips the lead 111. As later explained, the collet can be compressed longitudinally by engaging the inside of the cam faces 67 in the collet well 66, and when thus compressed will release the lead as shown in Figure 5*a*. Correspondingly when a lead is positioned against the forward end of the segment and the collet is then released it will surround and grip or pick up the new lead. Or the new lead can be introduced into the expanded collet with a rotary screwing motion.

Any other suitable collet may be used. For example as shown in Figure 5*b* a resilient metallic tubular collet 48' may be employed, having slits 110' and 110² running from the ends nearly to the middle for resilience.

As best seen in Figure 9*a*, when the segment is well advanced its guided portion 105 engages and is guided in the duohexagonal interior of the barrel portion 52. In this position, the sides 97 of the segment engage the sides 56 of two spaced lands, while the corner edges 103 engage the basic polygonal sides 54 of two spaced sides of the polygon. The outer portion 96' of the segment engages the inner surface 57 of the intermediate land 55. The segment is thus guided and imprisoned against movement out of the desired path. The segment over the guided portion 105 may if desired slightly taper to conform with the slight taper on the interior of the duopolygonal cross section.

Each individual segment is desirably made from plastic such as polystyrene, methyl methacrylate, cellulose acetate or acetate-butyrate, phenol formaldehyde or urea-formaldehyde, colored or coated to have the same color as the lead carried by its collet, and the lead in the storage groove 61 at the same radial position is desirably also of the same color. This is especially important as it is often impossible to tell from the exterior appearance of the lead (without causing the lead to write) whether the lead is one of several colors which resemble one another. Except for the difference in color (see colors in section on Figure 7) the segments can be identical.

In operation of the form of Figures 1 to 18 inclusive, the device is assembled by threading the shoe on the helix, and running the helix up close to the rear end. The collets are mounted on the segments. The various segments are then placed around the helix with the aligning projections against the rear end of the shoe, and the driving projection in one of the driving recesses. The spacer 87 is slipped over the hub 81 as by springing from the side, and then the barrel is slipped over the segments, the helix and the spacer, turning the barrel until the barrel slot 83 corresponds in position with the open side of the spacer. The tang of the clip is then inserted through the slot 83 and into the annular groove 82 on the hub of the helix. The barrel band 44 is then pushed over the head of the helix into place around the base of the clip.

Spare leads corresponding in color to the colors of the segments are then placed in the grooves 61 of the forward portion of the barrel at the proper radial positions, and while the leads are held in the grooves the tip is slipped over the forward end of the barrel, being careful to align the grooves 72 on the tip with the ribs 62 on the barrel. When the tip has moved up as far as permitted toward the rear of the barrel, the tip is locked in place by rotating it with respect to the barrel.

The eraser is then conveniently forced in the socket of the head of the helix.

The individual collets can be loaded in the following manner: Starting wth any segment the helix is turned clockwise as viewed from the rear toward the front as shown in Figure 14, and the pawl engages the ratchet of a particular adjoining segment, the segment being identifiable by the fact that the indication 88 on the outside of the head of the helix lines up circumferentially with the particular segment being selected. The pawl prevents the shoe from turning as the helix is turned clockwise in Figure 14 and since the shoe cannot turn as the helix turns the particular segment whose driving recess 95 is engaged by the driving projection or dog 91 on the shoe is advanced forward. As soon as this propelled shoe begins to advance, the outer cam surface on its offset portion 107 engaging the inner cam surface 58 on the barrel forces the forward end of that segment inwardly as shown in Figure 5. The forward end of the guiding portion 105 being forced inwardly is progressed in guided relation to the duopolygonal cross section of the interior of the barrel as shown in Figure 9*a*, firmly positioning and guiding the guided portion 105 of the propelled segment. At the same time, as shown in Figure 8*b*, the guided portion 105 which when radially outward has freedom laterally at 112 (Figure 8*a*) with respect to the other segments, now moves inwardly and wedges or jams the other segments outwardly, thus locking all other segments in the outward position (Figure 8*b*). Thus whereas formerly there was freedom at 113 between the barrel and the outside of the other segments, the other segments are now forced tightly against the barrel at 113' (Figure 8*b*). Also the other segments, which as shown in Figure 8*a* are narrower at the outside than the polygonal interior of the cross section, are crowded over slightly off center away from the inwardly wedging segment 114.

As seen in Figure 8*b* the corner cut-offs 103 of the two segments on either side of the wedging segment permit those segments to engage remote sides of the hexagon in common with the segments normally placed at such remote sides and thus provide room for the propelled segment to move inward.

I find it desirable to thicken the segments radially in Figure 8*b* (at the forward ends of the portion 105) by a few thousandths of an inch so that the propelled segment will flex or distort the helix 42 slightly from the center and thus tend to assure firmer contact with the shoe as the helix moves forward.

The outward wedging action on the other segments assures that the cam portions at the offsets 107 are firmly engaged against the interior cam portions 58 on the barrel, so that the other segments are effectively locked out and unable to move forward.

As the forward moving segment advances with the guided portion 105 in the duohexagonal part of the barrel, the collet moves into alignment with the center and eventually travels down the collet well 66 until it engages the cam surface 67 at the inside of the tip around the lead opening 68. The collet becomes compressed on the tapered portion 108 of the forward end of the segment as shown in Figure 5*a*, but has a tendency to expand forward when released. If now a lead 111 is inserted through the lead opening in the tip and the segment is retracted, the collet will expand longitudinally and also contract radially and grip the lead, achieving the position shown in Figures 5, 11 and 12. If preferred the segment may be retracted enough to expand the collet and the lead may be screwed or turned into the collet through the opening 68.

In order to retract the lead, the helix is turned counterclockwise looking toward the front from the rear, which causes the shoe to move rearwardly on the helix without turning. The projection 91 is prevented from turning due to engagement with the side of a locked out segment. As the segment moves up or down, the head 102 of the segment rides against the polygonal side of the interior of the barrel cross section, preventing the segment from moving outwardly from the shoe. At any position the segment position is shown outside the barrel by viewing the edge 106 through the transparent barrel. When the segment is fully advanced the engagement of the edge 106 against the interior cam surface 58 on the barrel acts as a stop against further advance.

As the segment is retracted it continues to move rearwardly without turning due to the engagement of the projection 91 with the sides of the next locked out segment until it encounters the aligning projections 94 on the various segments which are in rearward position. The segment which is just being retracted is brought into fully retracted position by the contact of the rearward edge of the shoe with its own aligning projection and all segments are held in rearward aligning position by their aligning projections contacting the rear of the shoe. On further turning of the helix counterclockwise as viewed from the rear toward the front the shoe is prevented from moving rearwardly as it is already in its full rearward position (since the threads on the helix stop at this point and prevent further longitudinal or rotational motion of the shoe with respect to the helix), and the shoe begins to ratchet or move its pawl over the ratcheting surfaces of the segments as best seen in Figure 13.

The pawl enters each segment at the wide spaced edge 101 and is drawn over the ratchet face of the segment toward the close spaced edge 100, while at the same time the pawl is forced toward the axis due to its resilience. This ratcheting action is accompanied by clicking as the pawl passes from one segment to the next, indicating to the user the number of segments over which he is turning. At the same time the indication 88 on the head of the helix lines up with a particular segment which is in selection position at any moment, so that the user can simply watch the colors of the segments and turn until the diamond or other indication 88 is in line with the segment of the desired color. At this point the user reverses the direction of rotation, turning clockwise when viewed from the rear toward the front as in Figure 14, and beginning the forward motion of the particular segment.

The above procedure can be employed successively to introduce lead into the collet of each segment, and also to accomplish the selection of the particular color which is to be used after the collets are filled. During use of the pencil, the collet well 66 tends to guide the collet and prevent the lead from wobbling.

It will be evident that segments are shaped for ratcheting with the helix or pawl on the shoe to permit selection of a particular color. The segment when it moves inwardly locks out the other segments by wedge action and is itself cammed into alignment with the hole in the tip.

The segment as it advances or retracts is guided by the duopolygonal cross section of the forward part of the barrel.

The user can view the color selected through the transparent barrel and can also view the amount of lead available by the indication of the segment position when the lead comes through the front of the tip.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claim.

Having thus described my invention what I claim as new and desire to secure by Letters Patent is:

A mechanical pencil having a body, a plurality of lead supports, a selected one of which moves longitudinally and at the forward end moves from the outside toward the center, a tip secured to the forward end of the body having a central lead opening adapted to guide the lead and having a shoulder around the central lead opening on the interior of the tip, longitudinally compressible collets on the lead supports of a diameter to engage the shoulder and said tip having a straight passage behind the shoulder into which the collet is received, in combination with walls forming a forwardly converging chamber rearwardly of the straight passage, adapted to deflect leads into the straight passage by bending of the collets as the lead carriers move forward.

References Cited in the file of this patent

UNITED STATES PATENTS

| | | |
|---|---|---|
| 489,043 | Smith | Jan. 3, 1893 |
| 2,624,313 | Jacobsen et al. | Jan. 6, 1953 |

FOREIGN PATENTS

| | | |
|---|---|---|
| 300,480 | Great Britain | Nov. 14, 1928 |